United States Patent [19]
Bradford

[11] Patent Number: 5,857,093
[45] Date of Patent: Jan. 5, 1999

[54] CROSS-COMPILED SIMULATION TIMING BACKANNOTATION

[75] Inventor: Jonathan D. Bradford, Township of Harpersfield, Ohio

[73] Assignee: Allen-Bradley Company, LLC, Milwaukee, Wis.

[21] Appl. No.: 717,393

[22] Filed: Sep. 20, 1996

[51] Int. Cl.$^6$ .................................................. G06F 9/455
[52] U.S. Cl. ........................... 395/500; 364/578; 364/488
[58] Field of Search .............................. 395/500, 183.09; 364/578, 488, 489, 490, 491

[56] References Cited

U.S. PATENT DOCUMENTS

| | | | |
|---|---|---|---|
| 4,821,220 | 4/1989 | Duisberg | 364/578 |
| 5,095,454 | 3/1992 | Huang | 364/578 |
| 5,210,700 | 5/1993 | Tom | 364/489 |
| 5,392,227 | 2/1995 | Hisenote | 364/490 |
| 5,396,615 | 3/1995 | Tani | 395/500 |
| 5,404,360 | 4/1995 | Suzuki et al. | 395/183.09 |
| 5,404,496 | 4/1995 | Burroughs et al. | 395/183.09 |
| 5,442,772 | 8/1995 | Childs et al. | 395/500 |
| 5,455,929 | 10/1995 | Bosshart et al. | 395/500 |
| 5,572,710 | 11/1996 | Asano et al. | 395/500 |
| 5,581,738 | 12/1996 | Dombrowski | 364/578 |
| 5,649,164 | 7/1997 | Childs et al. | 364/578 |
| 5,687,088 | 11/1997 | Tomita | 364/491 |
| 5,691,909 | 11/1997 | Frey et al. | 364/578 |
| 5,726,918 | 3/1998 | Giramma et al. | 364/578 |

*Primary Examiner*—Kevin J. Teska
*Assistant Examiner*—Tyrone V. Walker
*Attorney, Agent, or Firm*—David G. Luettgen; John M. Miller; John J. Horn

[57] ABSTRACT

A method and apparatus for simulating a microprocessor-based system produces simulations which are fast and which are accurate in terms of timing information produced. The source code is first compiled so as to produce a first program for a target microprocessor. Timing information is then extracted from the first program. The source code is compiled so as to produce a second program for a simulation microprocessor. The timing information is inserted into the second program, either directly or indirectly by way of the original source code. The second program thus has the timing information embedded therein and available for use by the simulation microprocessor, such that an output based on the timing information may be generated during the execution of the second program. A simulator which simulates execution of a first program by a target microprocessor comprises a simulation microprocessor and a second program. The second program is derived from a same source code program as the first program. Additionally, the second program has timing information embedded therein which pertains to the time required for a target microprocessor to execute individual portions of the first program.

23 Claims, 5 Drawing Sheets

```
50

52    long sim_time = 0

54    /*User defined macro*/
56    #define SIM_DATA (dt)                                            \
58        sim_time = sim_time + dt;  /*advance time*/                  \
60        if (sim_time >= next_sim_synch_time)                         \
62            informSimulatorThatSynchPointHasBeenReached ();

64    int example_function (int A, int B)
      {
66        int C = 7
68        SIM_DATA(3000) ; /*Added in timing annotation step (block 1) */
72        while (A< 100000)
          {
74            A = A + C;
76            B = A * (C + B);
78            SIM_DATA(1200); /*Added in timing annotation step (block 2)*/
          }
80        return(B)
      }
```

FIG. 4

CROSS-COMPILED SIMULATION TIMING BACKANNOTATION

FIELD OF THE INVENTION

This invention relates to techniques for simulating microprocessor-based systems, and more particularly relates to techniques for simulating microprocessor-based systems wherein timing information is backannotated into code executed by a simulation platform.

DESCRIPTION OF RELATED ART

It is often desirable to be able to simulate and evaluate a microprocessor-based system. Perhaps the most common situation which gives rise to such a desire is where the microprocessor-based system is still under development. In this situation, simulations facilitate hardware development by allowing more informed design choices to be made, such as the choice of a microprocessor. Further, simulations facilitate firmware and software development by eliminating the need for the actual hardware to be in existence when the firmware/software is tested.

One way to evaluate a microprocessor-based system is to create a hardware "mock-up" of the actual system which uses a microprocessor that is of the same type as the microprocessor of the actual hardware. Of course, this approach is of limited utility where the system is still under development and the microprocessor has not yet even been chosen. Even when the hardware design is essentially complete, it is undesirable to have to incur the costs of producing multiple hardware mock-ups for the various engineers who work on the same overall project. Finally, the use of such mock-ups has been found to be cumbersome for most applications.

Another way to evaluate a microprocessor-based system is to use a computer simulation that executes on a platform such as a Sparc workstation, IBM compatible computer, or other suitable device. The use of such systems has been found to be advantageous because the same hardware can be used to simulate a variety of microprocessors and because the same hardware can be used both to develop and to simulate firmware and software. As is known, firmware and software are now generally written using a high level programming language. The source code may be written and developed on the workstation, and can then be executed by the same workstation or by the actual hardware after the actual hardware has been developed. This is possible even though the microprocessor which performs the simulation (hereinafter, the "simulation microprocessor") is generally of a different type than the microprocessor of the actual hardware (hereinafter, the "target microprocessor"). (The ability to execute the source code on the workstation may, however, be limited to a minor extent if the source code has portions which are hardware specific and thus non-portable, as discussed below.)

When using the workstation as a simulation platform, it has been found that there is a trade-off between the speed with which the simulation is performed and the accuracy (especially in terms of the timing information produced) with which the simulation is performed. On the one hand, a very low level and detailed simulation can be performed. In this case, the simulation microprocessor conducts a register level emulation of the target microprocessor. The source code is not compiled for the simulation microprocessor but rather is compiled for the target microprocessor, and the simulation microprocessor uses the actual object code that would be used by the target microprocessor.

The advantage of this approach is that it is highly accurate in terms of the timing information produced. Since the simulation microprocessor uses the actual object code that would be used by the target microprocessor, it can be determined how many clock cycles a given set of instructions consumes. This information may then be combined with the known speed (cycles per second) of the target microprocessor to produce highly accurate timing information.

The disadvantage of this approach is that it is tremendously slow because there is an extra "layer" of processing required. The simulation microprocessor has to emulate at a register level the performance of the target microprocessor of a given set of instructions. Generally speaking, it has been found that such a detailed level simulation executes software about 1/100th to 1/1000th as fast as the target microprocessor. This slow pace makes register level simulations prohibitively slow and impractical for some applications.

On the other hand, a very high level simulation can be performed. For example, the source code may be compiled directly for the simulation microprocessor (not for the target microprocessor). The advantage of this approach is that it is very fast because the simulation microprocessor does not perform a register level emulation of the target microprocessor.

The disadvantage of this approach is that no useful timing information is produced. The timing information is based solely on the simulation microprocessor, and has nothing to do with the actual hardware. Thus, the simulation is incomplete, because the useful timing information is lost. Often, such timing information is critical, such as when the overall system under development involves cooperation between two or more microprocessors (each with their own timing) and the simulation involves simulating both microprocessors.

Thus, what is needed is a way of simulating a microprocessor-based system which is fast but which is nevertheless highly accurate in terms of timing information produced.

BRIEF SUMMARY OF THE INVENTION

The present invention takes advantage of the fact that the overall structure of an executable program is determined by the source code program from which it is derived. Thus, when source code is compiled for two different microprocessors, the overall structure of both executable programs is the same. It is therefore possible to determine the execution times for various blocks of one executable program, and annotate corresponding blocks of the other executable program with this information.

More specifically, according to a method of simulating of the present invention, the source code program is first compiled so as to produce a first program for a first microprocessor. Timing information is then extracted from the first program. The source code program is also compiled so as to produce a second program for a second microprocessor. The second program is annotated with the extracted timing information either directly or indirectly by way of the original source. If the annotating step is performed indirectly, the source code is annotated with the timing information before it is compiled to produce the second program. The second program thus has the timing information embedded therein and available for use, such that an output based on the timing information may be generated during the execution of the second program.

The timing information preferably pertains to the execution of non-branching execution blocks. Each non-branching execution block in the first program corresponds to a non-branching execution block in the second program, since both are derived from the same source code program. Thus, it is not necessary to annotate each line of code individually (which would make the resultant executable program very slow), because the timing information need only be annotated for each non-branching execution block as a whole.

A simulator which simulates execution of a first program by a target microprocessor comprises a simulation microprocessor and a second program. The second program is derived from a same source code program as the first program. Additionally, the second program has timing information embedded therein which pertains to the time required for a target microprocessor to execute individual portions of the first program.

Advantageously, the present invention facilitates hardware, software and firmware development by permitting simulations to be performed which are fast and which are accurate in terms of timing information produced. First, the present invention permits system timing to be evaluated before the actual hardware is complete. Second, the present invention helps to identify the source of timing problems by permitting visual examination of the annotated source code for timing bottlenecks. Third, the present invention may be used to avoid timing problems by ensuring that code is executed within predetermined timing parameters. Fourth, the present invention facilitates debugging software and firmware by permitting a simulation to be stopped at predetermined "virtual" time intervals so that software variables may be examined. Finally, the present invention facilitates making hardware design choices, such as the choice of a microprocessor.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 4 illustrates an exemplary block of source code which has been backannotated according to the present invention.

DETAILED DESCRIPTION OF THE PREFERRED EMBODIMENT

Figure 1:
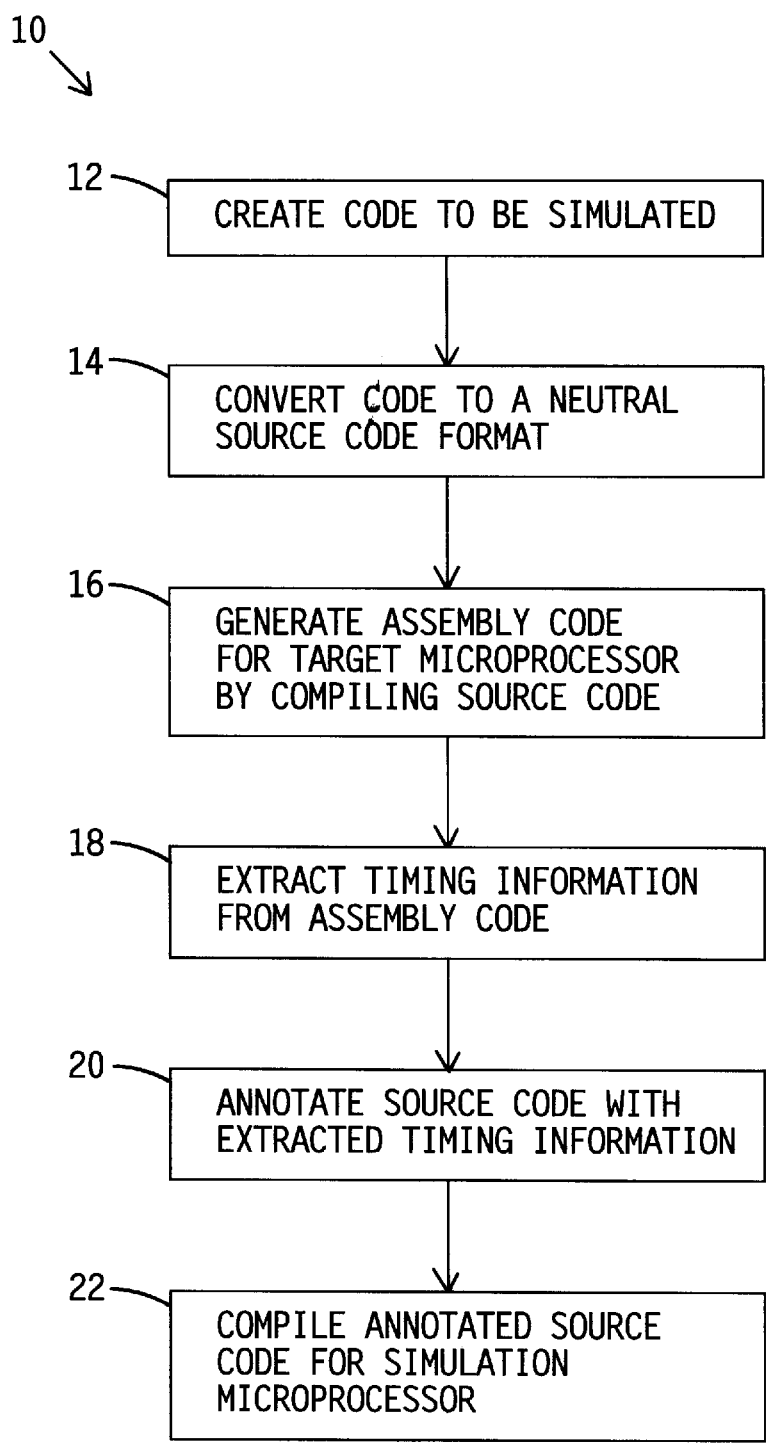
FIG. 1 illustrates the overall process for creating backannotated code according to the present invention.

FIG. 1 illustrates the overall process 10 for backannotating source code according to the present invention. The process 10 begins at step 12, whereat the source code to be simulated is created. Generally speaking, the present invention may be used in conjunction with any source code format, even if the source code is non-neutral. The term "non-neutral" source code refers to source code that can not be directly compiled for both the target microprocessor and the simulation microprocessor. In this case, it may nevertheless be possible to utilize the present invention by converting the non-neutral source code to a neutral format (step 14). For example, in the field of programmable logic controllers, there exist compilers which are able to convert (non-neutral) ladder logic control code to the (neutral) C programming language. The neutral source code may then be compiled to assembly code in step 16. On the other hand, if the source code is initially written in a neutral format (such as the C programming language), then step 14 may be skipped and step 16 may be performed directly. In any event, step 16 is performed wherein neutral source code is compiled for the target microprocessor.

Figure 2:
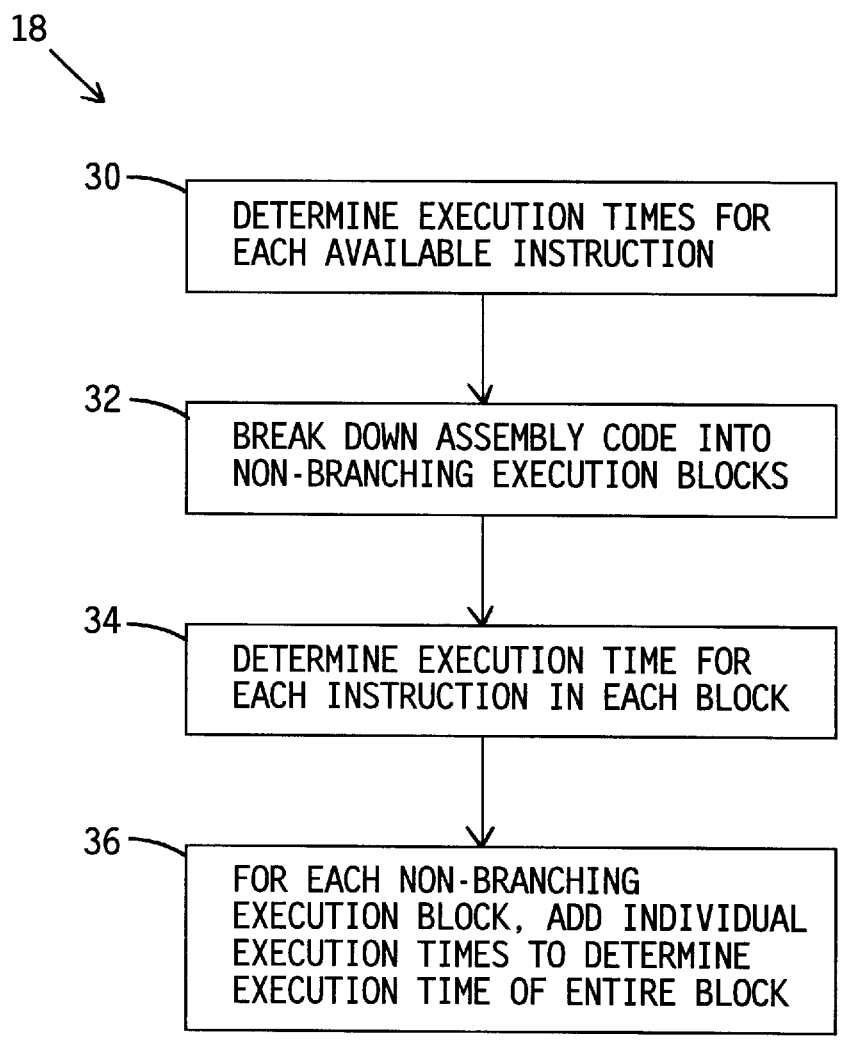
FIG. 2 illustrates in greater detail the step of extracting timing information from assembly code according to the present invention.

In step 18, the timing information is extracted from the assembly code. Step 18 is shown in greater detail in FIG. 2. Thus, as illustrated in FIG. 2, the step 18 of extracting timing information begins with the step 30 of determining the execution times for each instruction available for the target microprocessor. In practice, step 30 involves an individual referring to a reference manual for the target microprocessor which gives information as to how long it takes the target microprocessor to execute any given instruction.

The timing information gathered in step 30 is preferably used to create timing extractor software, which automatically performs the remaining steps 32–36 of FIG. 2. While these steps could be done manually, the use of timing extractor software (and timing insertion software, discussed below) removes most of the manual labor from the overall process 10. Indeed, one of the advantages of the present invention is that it is highly automated.

The timing extractor takes as input the assembly code generated in step 16. In steps 32 and 34, the timing extractor breaks down the assembly code into non-branching execution blocks and determines the execution time for each instruction in each block. (The order in which steps 32 and 34 are performed is unimportant.) The identification of non-branching execution blocks may be performed by identifying each instruction as either a branching instruction or a non-branching instruction. In step 36, individual execution times for instructions in the same blocks are added together, so that the total execution time for each individual non-branching execution block is determined.

The timing extractor can be created with varying degrees of accuracy. For example, the execution time of some instructions varies depending on the operand (e.g., the execution time of a multiply instruction typically varies depending on the numbers that are multiplied). Similarly, in some systems, the wait states of different types of memory accesses are different. Depending on the degree of accuracy and precision required, the timing extractor software can be (1) written so as to take these complexities into account, (2) written so as to assume worst case timing values, or (3) written so as to ignore these complexities. Often, such accuracy is not required, and thus these complexities may be ignored. For example, in one embodiment, the variable amount of time associated with the operands of some instructions was not taken into account (although the varying wait states were taken into account), and the accuracy of the simulation was still found to be within 1.5%. Typically, accuracy beyond 1.5% is unnecessary.

It should be noted that a different timing extractor must be created for each different microprocessor used (i.e., because the timing information used by the timing extractor is microprocessor-specific). However, once the timing extractor is created, it can be reused again and again as source code is developed and modified.

It should also be noted that, rather than using the extraction process described above, other methods could be used to generate timing information. For example, user-defined timing numbers could be used which are defined based upon an intuitive guess about how long it would take the target microprocessor to execute a given piece of code. The user-defined timing numbers could also be defined based upon bench measurements of target microprocessor execution times. The original source code may then be annotated with the user-defined timing numbers in generally the same manner (discussed below) as is used for extracted timing information (though the annotation process may be more labor-intensive if an automatic timing inserter is not used). The use of user-defined timing numbers could be also simplified by annotating the original source code at a higher level of generality (e.g., annotating the source code on a module-by-module basis rather than on a block-by-block basis). Finally, since the user-defined timing numbers may be generated without using the above-described extraction process, it would not ever be necessary to produce the first program by compiling the source code for the target microprocessor.

Figure 3:
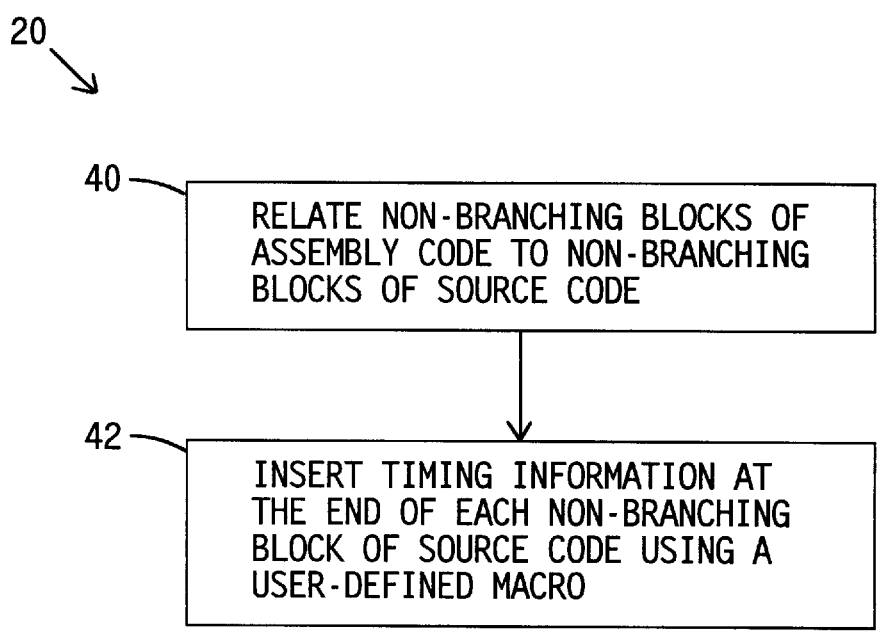
FIG. 3 illustrates in greater detail the step of annotating the source code with the extracted timing information according to the present invention.

In step 20, the original source code is annotated with the timing information extracted in step 18. (Although it would be possible to annotate the executable code for the simulation microprocessor directly, it is simpler to annotate the executable code for the simulation microprocessor indirectly by way of the original source code, as described herein.) Step 20 is shown in greater detail in FIG. 3, which illustrates steps 40–42. Preferably, the steps 40–42 are performed automatically using timing insertion software.

In step 40, the non-branching blocks of the assembly code are related to non-branching blocks of source code. Preferably, step 40 is performed by way of compiler-generated debug information. When source code is compiled, most commercially available compilers generate debug information. The debug information is used to relate lines of executable code back to lines of source code (i.e., so that if an error occurs during execution, the programmer can relate the reported error to a line of the original source code). Thus, this information may be used in the present context to relate non-branching blocks of the assembly code to non-branching blocks of source code.

In step 42, each non-branching block of source code is annotated with the timing information. Preferably, step 42 is performed by way of a user-defined macro. It has been found that the use of a user-defined macro to insert timing information back into the original source code is highly advantageous, because it gives a tremendous amount of flexibility as to what can be done with the timing information.

More specifically, as is known, macros allow a programmer to assign a name to an instruction sequence. The programmer uses the macro name in the source code instead of repeating the instruction sequence. The operands of the macro are the variables that are used by the instruction sequence. When the entire source program is compiled, the macros are replaced with the instruction sequence that defines them.

In the present context, the use of a user-defined macro makes the timing inserter's role merely to place the macro statement (including the timing information as an operand) back into the original source code. Once the macro statement is in the original source code, the timing information is present and is available for use in any manner. By changing the definition of the macro in the source code, the timing information can be used in different ways to perform different types of simulations. Accordingly, the timing inserter may be generic and need not be restricted to any particular type of simulation.

It should also be noted that the present invention is readily adaptable for studying parameters other than timing information. For example, it may be desirable to study the number of bytes consumed once the source code is compiled. The timing extractor may easily be modified to also include this information as part of the macro operand. The versatility of using a user-defined macro is again seen: One software engineer may study only the timing information by defining the macro one way, a second software engineer may study only the byte information by defining the macro a second way, a third software engineer may study both the timing information and the byte information by defining the macro a third way, and a fourth software engineer could ignore all extracted information altogether (i.e., perform a conventional high level simulation) by defining the macro to mean nothing.

It should also be noted that the timing inserter also need not be restricted for use with just one type of microprocessor (unlike the timing extractor). Specifically, many compilers are able to target several different microprocessors. A practical example is the GNU compiler, which is a very popular and widely available public domain C compiler. The debug information generated by the GNU compiler always has the same format, regardless of the microprocessor for which the source code is compiled. Further, different timing extractors can be written so as to have the same output format. Thus, if the debug information and the timing information always have the same format, the same timing inserter can be used for different microprocessors just by changing the input information.

On the other hand, if different compilers are used, it will likely be necessary to create different timing inserters if the different compilers generate debug information in different formats. Also, since the timing inserter is to some extent source code dependent, it will likely be necessary to create different timing inserters for different source code formats, even if the target microprocessor is the same in both instances. For example, a first timing inserter would be used with C source code, and a second timing inserter would be used with Pascal source code.

Finally, in step 22, after the source code has been annotated with the timing information in step 20, the source code is then compiled in step 22 for use by the simulation microprocessor. Once the process 10 is complete, the source code is backannotated as generally illustrated by way of example in FIG. 4.

FIG. 4 illustrates a block of source code 50 including individual lines of source code 52–80. Included in the source code are a macro definition block 54–62, two non-branching blocks of source code 64–66 and 72–76, and the corresponding macro statements 68 and 78, respectively. (Note that the reference numerals used to designate specific lines of code have been illustrated as line numbers for the code. Ordinarily, though depending on the source code, such line numbers would not be present.)

Line 56 is the macro definition statement. The name of the macro is thus "SIM_DATA" and it uses the operand dt (wherein dt is the inserted timing information). Lines 58–62 are the sequence of instructions which define the SIM_DATA macro. Line 58 monitors the variable sim_time and increments it by the amount dt each time the SIM_DATA macro is encountered. Line 60 determines whether the sim_time variable is greater than or equal to the next_sim_synch_time variable (i.e., line 60 determines whether the next simulation synchronization time has been reached), and if so a sequence of instructions which informs the simulation kernel that the synchronization point has been reached is executed at line 62. (For simplicity, the sequence of instructions is not specifically spelled out in FIG. 4.) The manner in which the SIM_DATA macro is used is discussed in greater detail in conjunction with FIG. 5.

FIG. 4 also illustrates two non-branching blocks of source code 64–66 and 72–76, which together form a function example_function. (Note that the particular functions performed by these lines of code are not important to the invention.) The timing information is inserted at line 68 in the form of the statement "SIM_DATA (3000)." The number 3,000 represents the number of time units required to execute lines 64 and 66. (More specifically, the number 3,000 represents the number of time units required to execute the object code instructions which are generated when the source code on lines 64 and 66 is compiled.) The units for this number could be clock cycles (including fractions of a clock cycle) or seconds (including fractions of a second), or any other convenient unit of measurement. In the preferred embodiment, clock cycles are used because it enables the use of the same timing extractor for several different microprocessors (i.e., where the only difference between the microprocessors is the clock speeds at which they operate). Also in the preferred embodiment, fractions of a clock cycle is used because memory wait states are usually fractions of a clock cycle, and the use of fractions of a clock cycle facilitates taking this parameter into account.

The SIM_DATA statement in line 78 corresponds to the lines of code 72–76. The operand 1200 indicates that it takes 1200 time units to execute the lines of code 72–76.

Timing information has not been inserted for the return(B) instruction at line 80. If it is desired to indicate the number of time units required to execute this instruction, a SIM_DATA statement could be placed just prior to line 80 (i.e., at a new line 79). Alternatively, the timing information could be added into the SIM_DATA statement contained at line 68, although this approach would be slightly less accurate. Note that if the SIM_DATA statement is placed after line 80, it would not get executed since the return(B) statement causes the microprocessor to exit out of example_function.

As discussed above, when the source code is compiled, the lines 68 and 78 are replaced by the instruction sequence contained at lines 58–62. Thus, after lines 64–66 are executed, the sim_time variable is incremented by 3000 units and a determination is made whether the next synchronization point has been reached. Similarly, after lines 72–76 are executed, the sim_time variable is incremented by another 1200 units and another determination is made whether the next synchronization point has been reached.

Figure 5:
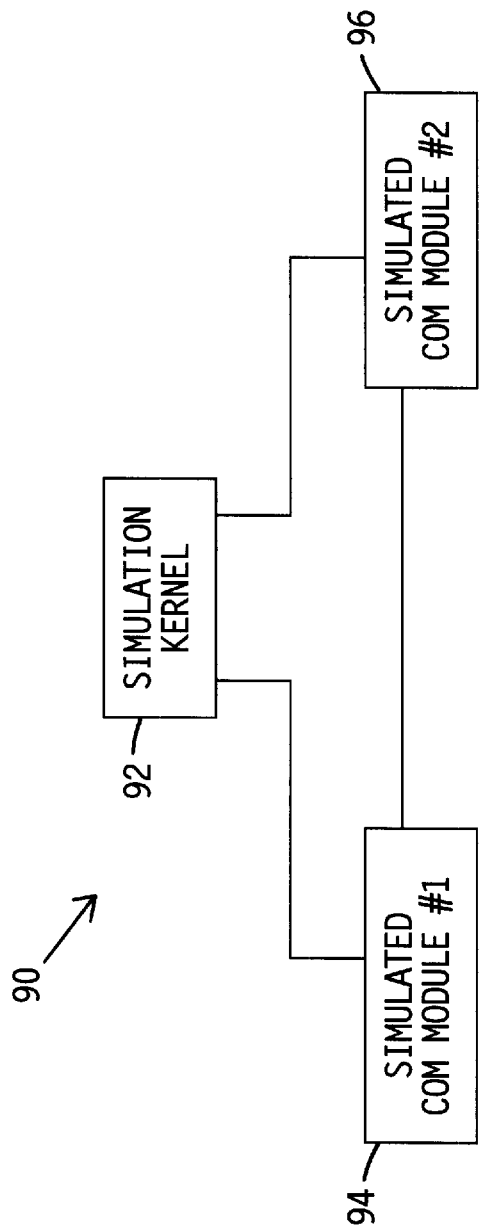
FIG. 5 illustrates a simulation system which utilizes source code which has been backannotated according to the present invention.

FIG. 5 illustrates an example of a simulation system 90 which utilizes the present invention. (Again, note that the present invention could be used in numerous other configurations, and the system 90 is merely exemplary.) The system 90 comprises a simulation kernel 92 connected to simulated devices 94 and 96. For example, the simulated devices 94 and 96 could be two communication modules, as illustrated. The simulation kernel 92 could be a commercial simulator or user written software. The simulation kernel's job is to allow the components of the simulation to interact and to keep them synchronized.

In practice, the system 90 may be implemented on a single or multiple workstations (depending on the simulation kernel). The workstation comprises a simulation microprocessor, an executable program corresponding to the communication module 94, and an executable program corresponding to the communication module 96. The executable programs are both annotated in the same manner as the source code illustrated in FIG. 4 (i.e., and they have been compiled). (Note that any functions not covered by the target microprocessors need to be accounted for in some other way, as discussed below.)

In operation, the simulation microprocessor alternates execution of the two executable programs as the devices 94 and 96 are stepped through operation. Thus, the executable program corresponding to device 94 is executed until a SIM_DATA macro statement informs the simulation kernel 92 that the device 94 has reached the next synchronization point, at which time execution is halted. Then, the executable program corresponding to device 96 is executed until a SIM_DATA macro statement informs the simulation kernel 92 that the device 96 has reached the next synchronization point, at which time execution is halted. This process is repeated over and over as the two devices 94 and 96 are stepped through their code. Thus, the simulations of the devices 94 and 96 are generally not done in real time; however, the devices 94 and 96 are nevertheless made to operate in the same virtual time domain.

The synchronization points may be spaced, for example, ten milliseconds apart so that each device is allowed to execute ten milliseconds worth of code at a time. (Of course, depending on the relative power of the two target microprocessors being simulated, ten milliseconds worth of code may be a substantially different amount of code in the two cases.) The accuracy of the simulation may be increased by spacing the synchronization points closer together.

In the above example, both target microprocessors perform essentially the same function (communication). However, the two target microprocessors could also perform two completely different functions. Indeed, it is not necessary that the simulation involve the synchronization of two microprocessor-based systems. Rather, one of the systems could be microprocessor-based (e.g., a conveyor control system) while the other system could be non-microprocessor-based (e.g, the conveyor itself).

As noted above, functions not handled by the target microprocessor (and thus handled by dedicated, unique hardware requiring hardware specific code) must be accounted for in some other way. For example, some microprocessor-based systems may have an Ethernet connection (which might even be part of the microprocessor itself), and there must be some way to account for the timing of the Ethernet connection hardware and the network itself, (i.e., network data transmission and response times). Further, any non-portable (hardware specific) portions of the source code must also be taken into account. For example, in the case of a very low level function, the source code may instruct the target microprocessor to access specific hardware addresses (e.g., the address of some unique peripheral hardware). However, the addresses of the simulation workstation are unlikely to correspond to the addresses of the target hardware which the target microprocessor is told to access. Again, there must be some way to account for such non-portable code. Both of these situations may be handled either by coupling the executable program to an external simulator that handles these functions, or by writing software functions to emulate the hardware to some degree (i.e., use a software stub). Of course, it may also be possible (depending on the simulated system) to simply ignore these complexities (i.e., use a software stub that contains nothing).

Advantageously, the present invention facilitates hardware, software and firmware development by permitting simulations to be performed which are fast and which are accurate in terms of timing information produced. It has been found that the present invention produces timing information which is typically accurate to within 1.5%. By comparison, register level simulations are typically accurate to within 0.5%.

With respect to the speed of simulation, it has been found that a simulation performed in accordance with the present invention can run significantly faster than the simulated system. This is because the simulation microprocessor is often more powerful than the target microprocessor. For example, if the simulation microprocessor is ten times more powerful than the target microprocessor, and the execution of the user-defined macros consumes half the simulation microprocessor's time, then the simulation would still be approximately five times as fast as the actual hardware. By comparison, a register level simulation typically is only 1/100th to 1/1000th as fast as the actual hardware.

Thus, while the present invention is slightly less accurate than a register level simulation, the loss in accuracy is negligible and the invention is nevertheless highly accurate. Further, the loss in accuracy is tremendously overshadowed by the dramatic increase in speed at which simulations may be performed.

The present invention can be put to a variety of advantageous uses. First, the present invention permits system timing to be evaluated before the actual hardware is complete. For example, the simulation system 90 could be used to determine whether a first communication module (simulated by the communication module 94) will be able to keep up with data coming from a second communication module (simulated by the communication module 96).

Second, the present invention helps identify the source of timing problems. For example, if one of the communication modules 94 and 96 is unexpectedly slow, the backannotation of timing information could be used to permit a design engineer to visually inspect code. This could be done once step 20, discussed above, is completed. In this case, the engineer can study the amount of time that it takes for each non-branching segment to be executed and thereby identify unexpected timing bottlenecks.

Third, the present invention may be used to avoid timing problems. For example, the present invention could be used to ensure that it never takes more than a predetermined amount of time to run a given software routine. In this case, the SIM_DATA macro could be used to set an error flag if the sim_time variable ever exceeded the predetermined value.

Fourth, the present invention facilitates debugging software and firmware. For example, the present invention could be used to simply stop the simulation at predetermined "virtual" time intervals so that software variables may be examined.

Fifth, the present invention facilitates making hardware design choices. For example, the present invention may be used to compare the performance of various microprocessors so that the microprocessor with the best price/ performance characteristics can be selected. The present invention is especially useful in this regard because it makes it possible to simulate the execution of a given piece of code by several different microprocessors with relative ease. (In this regard, it may be noted that the use of the present invention in this manner is furthered by using a compiler which is able to target several different microprocessors, such as the GNU compiler discussed above. The use of such a compiler is advantageous because then the source code is compiled similarly for the two target microprocessors, providing a more uniform basis for comparison.) The use of the present invention in this manner avoids having to select a microprocessor based merely on an intuitive guess about the match between microprocessor capabilities and perceived system requirements. Such intuitive guesses can waste a tremendous amount of money when the wrong selection is made and it is necessary to redesign the system for a new microprocessor.

Notably, most of these advantages can be obtained regardless of how the actual system is configured. The present invention can be used to simulate a system having any number of microprocessors.

Many other changes and modifications may be made to the present invention without departing from the spirit thereof. The scope of these and other changes will become apparent from the appended claims.

I claim:

1. A simulator adapted for simulating execution of a first executable program by a microprocessor-based device having a target microprocessor, said simulator comprising:

a simulation microprocessor, said simulation microprocessor having operational characteristics which are different than operational characteristics of said target microprocessor; and a second executable program, said second program being derived from a same source code program as said first program, said second program being executable by said simulation microprocessor, said second program having timing information embedded therein, said timing information pertaining to time required for said target microprocessor to execute individual portions of said first program, and said timing information being embedded in said second program in the form of a plurality of executable instructions that each (1) correspond to a different respective one of said individual portions of said first program and (2) take as an operand said timing information pertaining to said time required for said target microprocessor to execute said respective one of said individual portions of said first program.

2. A simulator adapted for simulating execution of a first executable program by a microprocesser-based device having a target microprocessor, said simulator comprising:

a simulation microprocessor, said simulation microprocessor having operational characteristics which are different than operational characteristics of said target microprocessor; and a second executable program, said second program being-derived from a same source code program as said first program, said second program being executable by said simulation microprocessor, said second program having timing information embedded therein, said timing information pertaining to time required for said target microprocessor to execute individual portions of said first program; and wherein said timing information is embedded so as to be associated with non-branching execution blocks of said second program, and wherein said individual portions of said first program are non-branching execution blocks which correspond to said non-branching execution blocks of said second program.

3. A simulator adapted for simulating execution of a first executable program by a microprocessor-based device having a target microprocessor, said simulator comprising:

a simulation microprocessor, said simulation microprocessor having operational characteristics which are different than operational characteristics of said target microprocessor; and a second executable program, said second program being derived from a same source code program as said first program, said second program being executable by said simulation microprocessor, said second program having timing information embedded therein, said timing information pertaining to time required for said target microprocessor to execute individual portions of said first program; and wherein said timing information is embedded in said second program indirectly by way of said same source code program, wherein said timing information is embedded in said same source code program in the form of a macro, and wherein operands of individual macro statements contain said timing information.

4. A simulator according to claim 3, wherein information pertaining to bytes consumed by said non-branching blocks of said first program is also embedded in said same source code program with said user defined macro, said operands of said individual macro statements also containing said information pertaining to said bytes consumed.

5. A simulator adapted for simulating execution of a first executable program by a microprocessor-based device having a target microprocessor, said simulator comprising:

a simulation microprocessor, said simulation microprocessor having operational characteristics which are different than operational characteristics of said target microprocessor; and a second executable program, said second program being derived from a same source code program as said first program, said second program being executable by said simulation microprocessor, said second program having timing information embedded therein, said timing information pertains to time required for said target microprocessor to execute individual portions of said first program.

6. A method comprising:

compiling a source code program so as to produce a first executable program for a first microprocessor;

extracting timing information from said first program;

compiling said source code program so as to produce a second executable program for a second microprocessor;

annotating said second program with said timing information, said annotating step further including annotating said source code program with said timing information such that said timing information is annotated into said second program indirectly by way of said source code program, and said step of annotating said source code program further including inserting a macro into said source code program prior to said compiling step, said macro taking said timing information as an operand, and executing said second program with said second microprocessor and generating an output based on said timing information so as to inform a simulation of a microprocessor-based system, said generating step being performed by said second microprocessor when said second microprocessor is executing executable instructions corresponding to said macro.

7. A method according to claim 6, wherein said executing step includes performing a first type of simulation during which said macro has a first definition;

changing the definition of said macro in said source code program to a second definition to permit a second type of simulation to be performed; and performing said second type of simulation when said macro has said second definition.

8. A method according to claim 6, further comprising generating a program in a non-neutral format; and converting said program to said source code program, wherein said source code program has a neutral format.

9. A method according to claim 6, wherein said annotating step includes relating lines of code of said first program to lines of code of said source code program, and wherein said relating step is performed using debugging information generated during said compiling step.

10. A method comprising:

compiling a source code program so as to produce a first executable program for a first microprocessor;

extracting timing information from said first program;

compiling said source code program so as to produce a second executable program for a second microprocessor;

annotating said second program with said timing information;

executing said second program with said second microprocessor and generating an output based on said timing information so as to perform a simulation of a microprocessor-based system, said executing step including ascertaining that a synchronization point has been reached based on said timing information annotated in said second program, informing a simulation kernel that said synchronization point has been reached, temporarily interrupting said executing step while a simulation of another system is performed, and then continuing said executing step after said simulation of said another system has reached said synchronization point, and repeating said ascertaining, informing, and temporarily interrupting steps such that the simulation of said second microprocessor and said simulation of said another system are synchronized based on said timing information annotated in said second program.

11. A method comprising:

compiling a source code program so as to produce a first executable program for a first microprocessor;

extracting timing information from said first program;

compiling said source code program so as to produce a second executable program for a second microprocessor;

annotating said second program with said timing information;

wherein said timing information extracting step further comprises partitioning said first program into non-branching execution blocks formed of non-branching segments, generating first and second timing numbers for first and second instructions of one of said non-branching execution blocks, said first timing number representing an amount of time required to execute said first instruction and said second timing number representing an amount of time required to execute said second instruction, adding said first and second timing numbers so as to form a composite timing number, said timing information annotated into said first simulation program being based on said composite timing number, and repeating said generating and adding steps for substantially the entire portion of said first program to be simulated.

12. A method according to claim 11, wherein the units of said timing number are either fractions of a second or fractions of a clock cycle.

13. A method of simulating a system having first and second microprocessor-based subsystems, said first microprocessor-based subsystem having a first target microprocessor and said second microprocessor-based subsystem having a second target microprocessor, the method comprising:

A. generating a first target program compiled for said first target microprocessor;

B. generating a first simulation program for a simulation microprocessor used to simulate said first and second target microprocessors, said first simulation program having timing information embedded therein, said timing information pertaining to time required for said first target microprocessor to execute individual portions of said first target program;

C. generating a second target program compiled for said second target microprocessor;

D. generating a second simulation program for said simulation microprocessor, said second simulation program having timing information embedded therein, said timing information pertaining to time required for said second target microprocessor to execute individual portions of said second target program;

E. defining a plurality of synchronization points which occur at predetemined virtual time intervals;

F. executing said first simulation program with said simulation microprocessor;

G. interrupting said executing step (F) when one of said plurality of synchronization points is reached, said interrupting step (G) occur based on said timing information embedded in said first simulation program;

H. executing said second simulation program with said simulation microprocessor;

I. interrupting said executing step (H) when said one of said plurality of synchronization points is reached, said interrupting step (I) occurring based on said timing information embedded in said second simulation program; and J. repeating steps (F), (G), (H) and (I) such that said first and second simulation programs are executed in a same virtual time domain as defined by said timing information embedded in said first and second simulation programs.

14. A method according to claim 13, wherein said step of generating a first simulation program further comprises partitioning said first target program into non-branching execution blocks formed of non-branching segments;

generating first and second timing numbers for first and second instructions of one of said non-branching execution blocks, said first timing number representing and amount of time required to execute said first instruction and said second timing number representing an amount of time required to execute said second instruction;

adding said first and second timing numbers so as to form a composite timing number, said timing information embedded into said first simulation program being based on said composite timing number; and repeating said generating and adding steps for substantially the entire portion of said first target program to be simulated.

15. A method according to claim 13, wherein said timing information is embedded in said first simulation program by way of a macro inserted in a source code program from which said first target program and said first simulation program are commonly derived.

16. A method according to claim 15, further comprising performing a first type of simulation during which said macro has a first definition;

changing the definition of said macro in said source code program to a second definition to permit a second type of simulation to be performed; and performing said second type of simulation when said macro has said second definition.

17. A simulation system comprising:

a simulation microprocessor used to simulate a target microprocessor, said simulation microprocessor and said target microprocessor being of different types;

a source code program;

a compiler adapted for compiling said source code program, said compiler generating debugging information which relates lines of executable code to lines of source code;

a first executable program derived from said source code program, said first program being generated by said compiler, said first program being formed of a first plurality of non-branching segments, and said first program being compiled for said target microprocessor;

a second executable program derived from said source code program, said second program being formed of a second plurality of non-branching segments corresponding to said first plurality of non-branching segments, said second program being executable by said simulation microprocessor;

a timing extractor, said timing extractor being adapted for identifying said first plurality of non-branching segments in said first program and for generating a plurality of timing numbers, said plurality of timing numbers representing an amount of time required by said target microprocessor to execute each of said first plurality of non-branching segments; and a timing inserter, said timing inserter being adapted for annotating said source code program with said plurality of timing numbers generated by said timing extractor, said source code program being annotated with a macro wherein individual macro statements take one of said timing numbers as an operand, and wherein said timing inserter utilizes said debugging information to annotate said source code program.

18. A simulation system according to claim 17, wherein said simulation system stimulates an industrial controller which comprises said target microprocessor.

19. A method of simulating execution of a first executable program by a target microprocessor using a second executable program executed by a simulation microprocessor, the method comprising:

compiling a source code program so as to produce said first program for said target microprocessor;

extracting timing information from said first program, said timing information pertaining to time required for said target microprocessor to execute individual portions of said first program;

compiling said source code program so as to produce said second program for said simulation microprocessor;

annotating said second program with said timing information, said annotating step including providing said second program with a plurality of executable instructions that each (1) correspond to a different respective one of said individual portions of said first program and (2) take as an operand said timing information pertaining to said time required for said target microprocessor to execute said respective one of said individual portions of said first program; and executing said second program with said simulation microprocessor to simulate said execution of said first program by said target microprocessor, including generating an output based on said timing information.

20. A method according to claim 19, wherein the step of providing said second program with said plurality of executable instructions includes providing said second program with a plurality of sequences of executable instructions, each of said plurality of sequences of executable instructions comprising one of said plurality of executable instructions.

21. A method according to claim 20, wherein said annotating step further comprises annotating said source code program with said timing information such that said timing information is annotated into said second program indirectly by way of said source code program.

22. A method according to claim 21,
wherein said annotating step further comprises inserting a plurality of macros into said source code program prior to said compiling step, said plurality of macros taking said timing information as an operand, and wherein each of said plurality of sequences of executable instructions in said second program corresponds to one of said plurality of macros in said source code program.

23. A method according to claim 19, wherein said executing step simulates an industrial controller which comprises said target microprocessor.

* * * * *